May 26, 1959 C. G. SPRINGER, JR 2,888,077

INTERSPERSED GANG PUNCH DEVICE

Filed April 13, 1954 6 Sheets-Sheet 1

INVENTOR.
CHARLES G. SPRINGER, JR.

BY Ralph C. Pastan

ATTORNEY

May 26, 1959 C. G. SPRINGER, JR 2,888,077

INTERSPERSED GANG PUNCH DEVICE

Filed April 13, 1954 6 Sheets-Sheet 2

INVENTOR.
CHARLES G. SPRINGER, JR.

BY Ralph C. Dustin

INTERSPERSED GANG PUNCH DEVICE

Filed April 13, 1954 6 Sheets-Sheet 3

INVENTOR.
CHARLES G. SPRINGER, JR

BY Ralph C. Austin

ATTORNEY

INVENTOR.
CHARLES G. SPRINGER, JR
BY Ralph C. Rustin
ATTORNEY

May 26, 1959 C. G. SPRINGER, JR 2,888,077

INTERSPERSED GANG PUNCH DEVICE

Filed April 13, 1954 6 Sheets-Sheet 5

INVENTOR.
CHARLES G. SPRINGER,JR

BY Ralph C. Dustin

ATTORNEY

INTERSPERSED GANG PUNCH DEVICE

Filed April 13, 1954 6 Sheets-Sheet 6

INVENTOR.
CHARLES G. SPRINGER, JR.
Ralph C. [signature]
ATTORNEY 2,888,077
Patented May 26, 1959

2,888,077

INTERSPERSED GANG PUNCH DEVICE

Charles G. Springer, Jr., Hyde Park, N.Y., assignor to International Business Machines Corporation, New York, N.Y., a corporation of New York Application April 13, 1954, Serial No. 422,791
3 Claims. (Cl. 164—115)

This invention relates generally to record perforating machines and more particularly to an improvement in machines for reproducing and gang punching record cards under the control of other perforated cards.

A record card perforating machine of this general type is illustrated and described in United States Patent No. 2,647,581, which was filed July 6, 1949, on behalf of E. W. Gardinor and A. B. Crowell and issued August 4, 1953.

The record cards handled by this machine are of the usual variety having 80 columns of punching positions with 12 index points per column, and are fed from a card supply hopper through a punching station and thereafter through a sensing station to a card stacker. A card progressing through the punch station may be perforated under control of a manual keyboard, automatically by duplication of data sensed from a preceding card in the sensing station, or from data recorded on a card carried by an auxiliary drum under control of a program drum. Normally, when duplicating the data sensed from a card in the sensing station, perforations are made in selected columns of each succeeding card as sensed from selected columns of the previous card in accordance with control data recorded in the program drum. At times, it is desired to duplicate information from master cards into one or more detail cards. The master cards cannot conveniently be interspersed with the detail cards in the card hopper and fed through the punch station since the master cards would then be perforated with data sensed in the preceding card, unless the operator visually determines when a master card reaches the punching station and manually operates a switch at the precise moment necessary to stop duplication into the master card. At a speed of approximately 15 cards per minute, this would require constant attendance and extreme alertness on the part of the operator. It would then be necessary to depress a release key to feed the master card through the punch station and another key to register a new card. An alternative method is to manually insert the master card in the sensing station and the required number of detail cards in the card hopper to gang punch in the detail cards the data from the master card. This manual operation would have to be repeated for each master card and its accompanying group of detail cards. Keeping this in mind, the advantages of the present invention will be readily appreciated since it eliminates the manual insertion of each master card and allows any number of master cards to be interspersed with the detail cards in the hopper, limited only by the hopper capacity.

In accordance with the invention, the master cards are interspersed with the detail cards, as stated, and the normal machine operation is started by initiating a card feed cycle to feed the first card, a master card, to a pre-registration position and a second card feed cycle to register the master card at the punch station, after which the master card is released through the perforating station to the read station whereupon the gang punching operation is automatically initiated. This operation then continues automatically, gang punching data read from the card in the sensing station into the card in the perforating station, until the last detail card preceding the next master card is perforated. At this point the card sensing and perforating operations are suspended until the following master card is registered at the read station.

As described in the aforementioned patent, a printing device is mechanically linked with the perforating apparatus so that for each combination of one or more punch elements set up, a corresponding print element is also set up and, during the punch cycle, the particular character may be printed and punched simultaneously or punched only. The combination of printing and punching apparatus form no part of the present invention, however, it is intended that the term recording as used hereinafter be inclusive of one or both operations.

Accordingly, one object of the present invention is to automatically suppress card sensing and recording operations while allowing escapement and card feeding to continue until a master card following a detail card of a previous group passes through the perforating station.

Another object of this invention is to provide a machine of the type described having means for detecting the presence of a master card before it arrives at the perforating station and automatically suppressing certain normal operations of the machine while allowing other functions to continue.

Yet another object of the present invention is to permit the placing of master cards in the same hopper with the detail cards into which the master card data are to be gang punched, and to permit the master cards to be interspersed therewith in such a manner that each master card precedes the detail cards into which the data from that particular master card are to be gang punched.

A further object of this invention, applicable to a machine having means to duplicate data from an auxiliary source as well as from a card in the sensing station is to provide means for automatically suppressing duplication of data from such auxiliary source while a master card is passing through the punch station.

In a machine of the type referred to above, the cards are fed through the sensing and perforating stations in intermittent steps corresponding with the eighty card columns. This step-by-step advance is unnecessary and time consuming since no perforating is done while a master card is passing through the perforating station. It is a further object of this invention to accelerate the passage of master cards through the perforating station and eliminate this loss of time.

When the master card arrives at the sensing station, unless another master card follows without intervening detail cards, a detail card into which information is to be duplicated will be registered in the perforating station. It is still another object of this invention to provide means for automatically resuming the duplicating operation when a master card reaches the sensing station.

Other objects of the invention will be pointed out in the following descriptions and illustrated in the accompanying drawings, which disclose by way of example, the principle of the invention and the best mode which has been contemplated of applying that principle.

Figure 1:
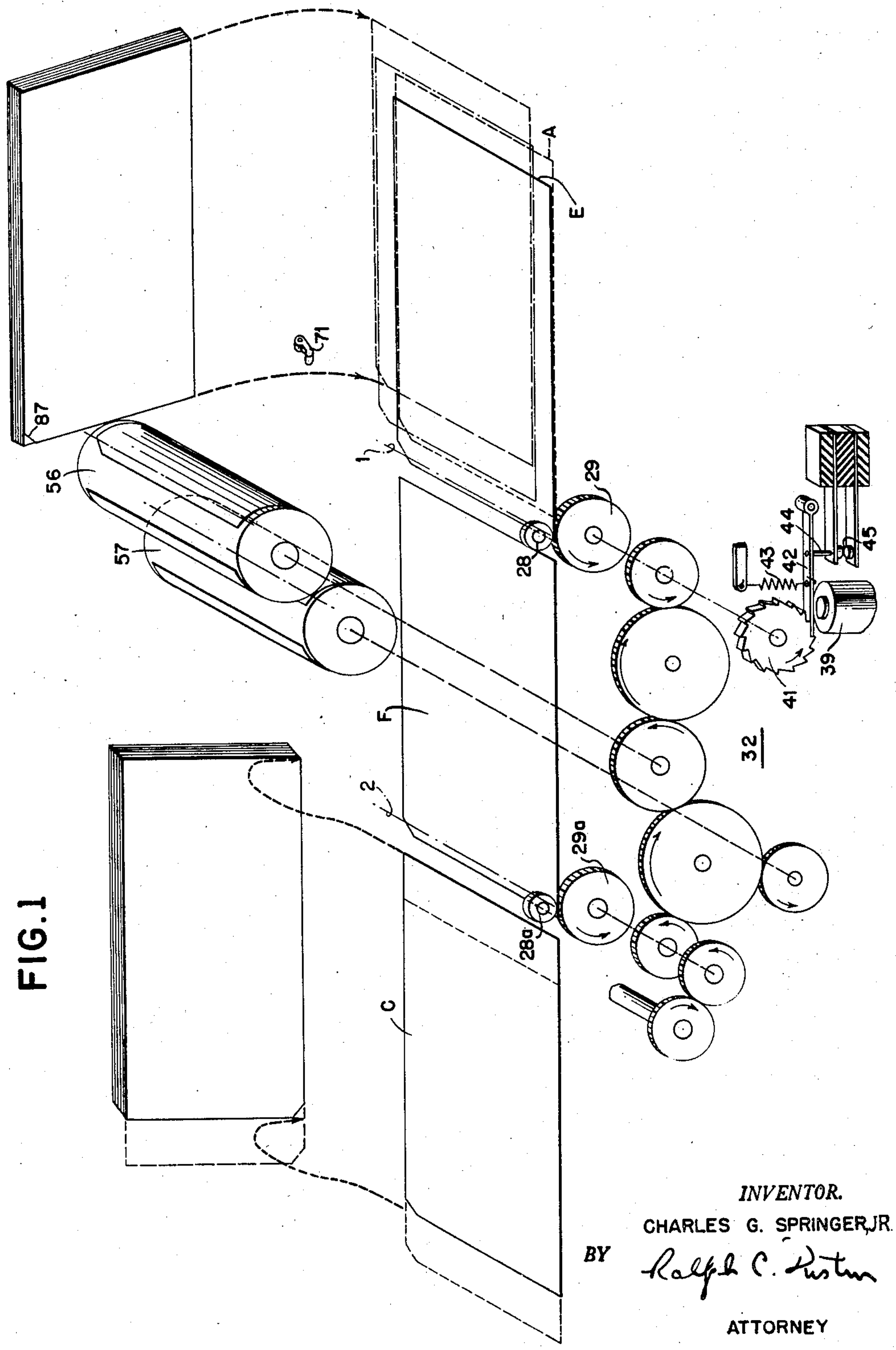
Fig. 1 is a schematic showing of the card transporting, punching and sensing mechanism.

Referring to Fig. 1, a record card shown in the upper right hand corner, is fed from a card hopper, not shown, to a position designated by the letter A. From this position, the card is fed to the left, in a direction at right angles to the first path of movement, past a row of punches arranged along schematically represented punching line 1. Movement of the card past the punching line 1 is controlled to occur in intermittent column-by-column steps and the card is advanced toward a row of sensing or reading elements arranged along a schematically represented sensing line 2, so that, after the card has been perforated at the line 1, the perforations are sensed or analyzed column-by-column as the card passes the line 2.

After passing the reading line 2, the card is advanced to a position C from which it is delivered to a discharge hopper not shown.

In transferring a card along the path from position A to position C, a feeding mechanism initially advances the card to the aforementioned position A during what may be called a first card cycle. During a second card feed cycle, the card is further shifted so as to be registered at a position E with the first column of the card one column to the right of the punching line 1. Also during the second card feed cycle, a second card is advanced from the hopper to the intermediate position A. From the point of registration E, the first card is advanced column-by-column past the punching line 1 under control of a keyboard or other instrumentalities (not shown), while the second card remains in the intermediate position A. After the last column of the first card has traversed the punching line 1, a third card feed cycle is initiated and this card is advanced to position F, where the first column thereof is positioned at the reading line 2. During this third card feed cycle the second card is advanced to the registration position E and a third card is advanced from the hopper to the intermediate position A. The first and second cards then move concurrently so that one passes the reading line 2 while the other advances past the punching line 1 until the second card has completely traversed the punching line. Thereafter, a fourth card cycle is initiated and the first card is advanced to position C, the second card is advanced to the reading line 2, the third card is advanced to the registration position E and a fourth card is advanced to the intermediate position A. It is thus seen that four operating cycles are required for the complete passage of a record card through the machine.

The mechanism employed for moving the cards from position to position as described, is set forth in detail in the aforementioned patent and need only be briefly described here. This mechanism is shown partially in Fig. 2 where it is seen that a motor M, through a belt and pulley connection, drives a shaft 3 which in turn drives a further shaft 4 through a gear train labeled generally as 6 and a well known one-revolution type clutch device 7. The clutch device is controlled by an electromagnet 8, which is shown schematically in Fig. 2 and which corresponds to element "28" shown in Fig. 6 of the aforementioned Patent No. 2,647,581. As described therein, provision is made to hold the magnet 8 energized for a period longer than one revolution of the shaft 4 and to deenergize it before completion of the second revolution. Thus, for each energization of magnet 8, there will occur two revolutions of shaft 4 constituting what will be designated hereinafter as a card feed cycle. The circuit for performing this function is shown in Fig. 7 and will be described hereafter.

Figures 3, 5, 6:
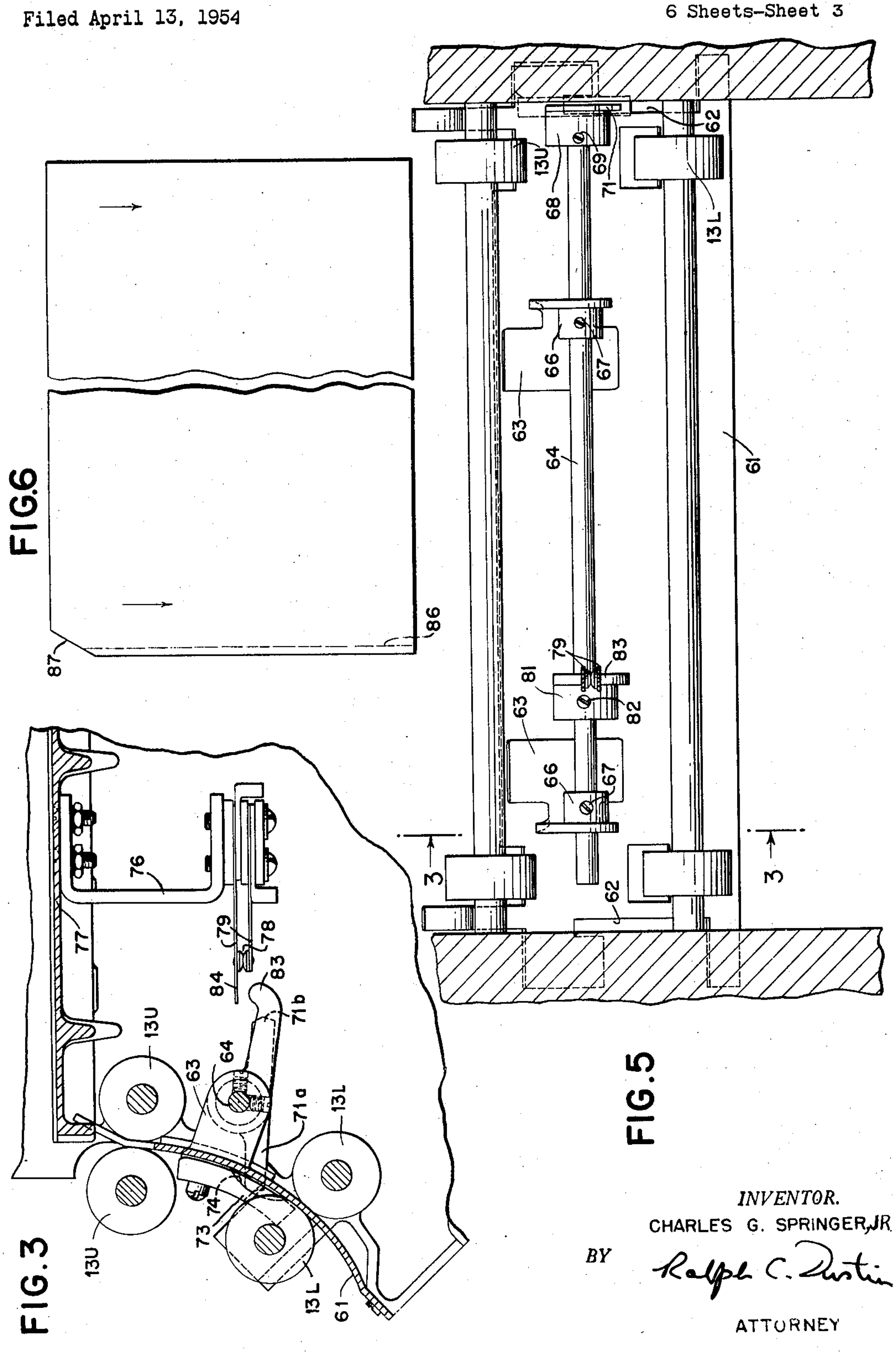
Fig. 3 is a partial right side section of the card hopper and card transporting mechanism showing the cut corner sensing mechanism and the contacts operated thereby.
Fig. 5 is a partial rear view of the mechanism of Fig. 3.
Fig. 6 is a broken view of a corner cut master card.
Figure 7:
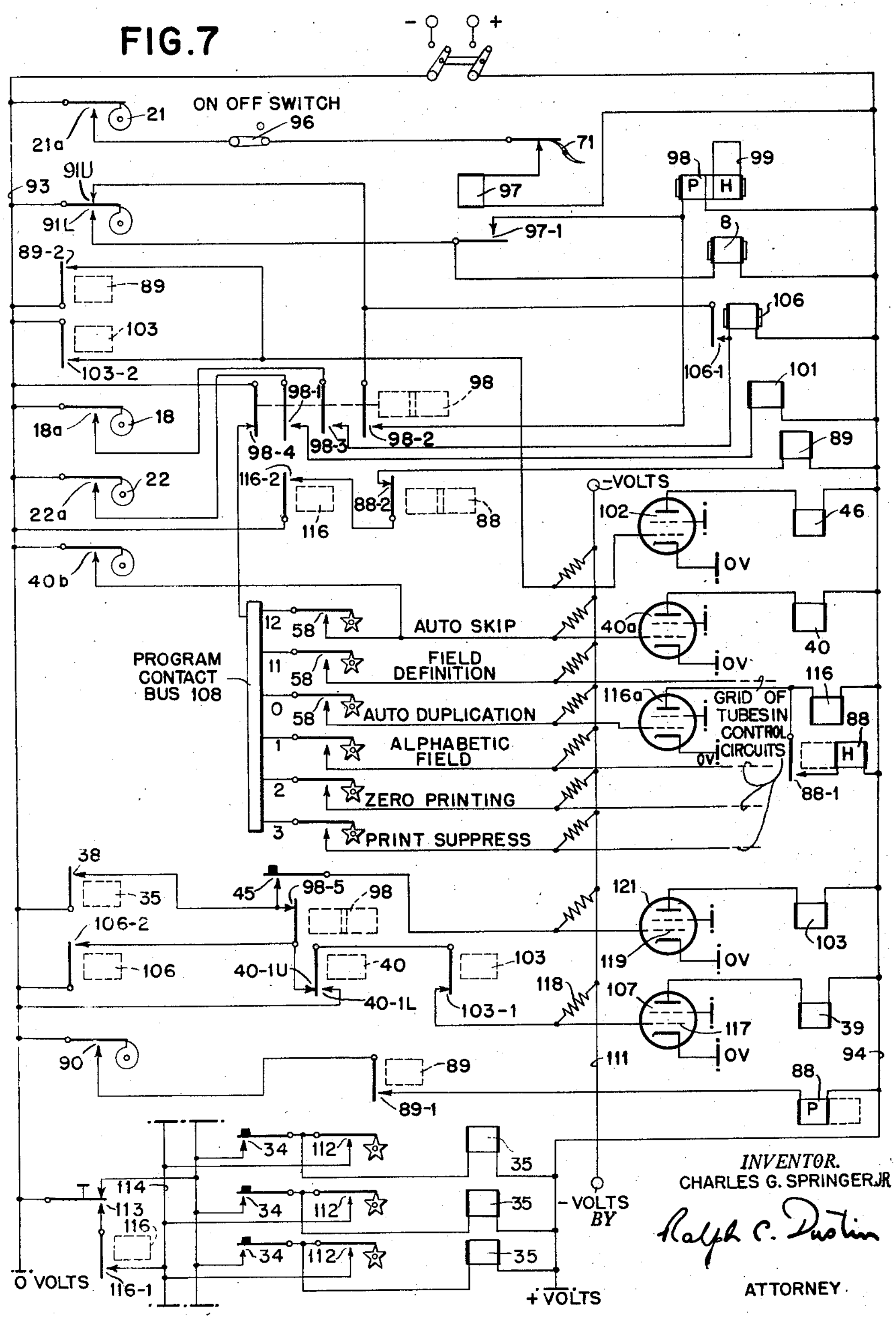
Fig. 7 is a partial wiring schematic showing the contacts utilized in the operation of the Interspersed Gang Punch feature.

The shaft 4 drives a shaft 9 through a pair of gears 11 and 12 and, through further gearing, operates a card feed mechanism such as that described in detail in the aforementioned application and which is shown partially in Fig. 3. Referring to this figure, a set of feed rolls labeled as elements 13U (upper) and 13L (lower) transport each card as it is fed into engagement therewith by feed knives, not shown, advancing the card to the position "A" as viewed in Fig. 1.

Figure 2:
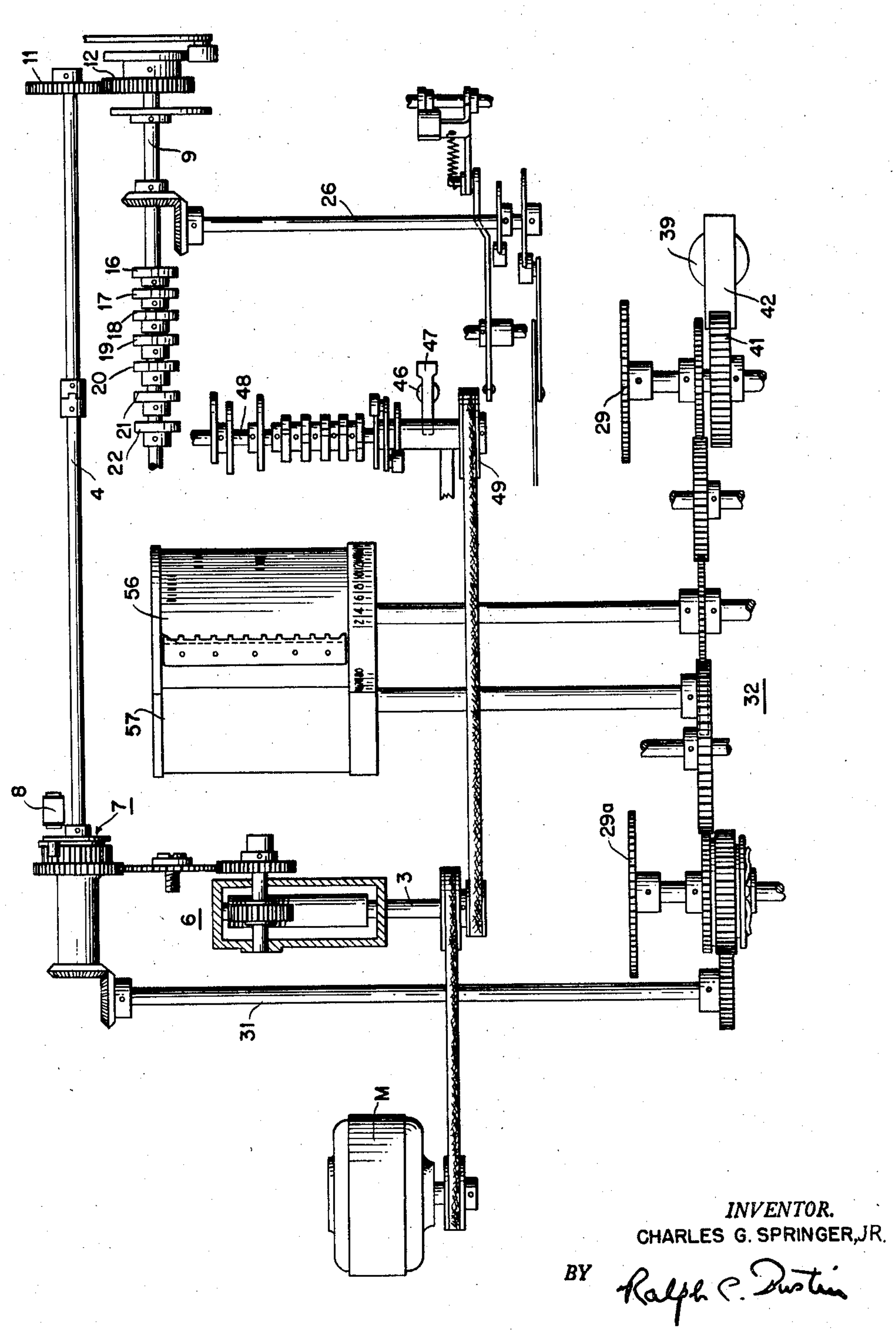
Fig. 2 is a view of the driving means and the power transmitting means to effect the transportation, punching and sensing of cards.

Affixed to the shaft 9, Fig. 2, are seven cams labeled 16–22 which close associated contacts shown in Fig. 7 during predetermined periods of each card feed cycle, closure periods for the contacts are indicated by the heavy lines in the timing chart of Fig. 8, and energize relays in timed sequence in performing the operation of the machine as will be described hereinafter in connection with the electrical circuit diagram of Fig. 7.

A further shaft 26 is coupled to and driven from the shaft 9, as seen in Fig. 2 and controls the operation of a pusher (not shown) for effecting the aforementioned movement at right angles to the direction of movement from the card hopper and the raising of a pressure roller 28 which is positioned above a card feed roller 29 as seen in Fig. 1. As viewed in Fig. 2, the roller 29 is driven from the motor M through a shaft 31 and a gear train, generally designated 32, which drives the feed roller 29 in the punch station and its counterpart 29*a* in the sensing station. The pressure roller 28 also has a counterpart 28*a* cooperating with the feed roll 29*a* as seen in Fig. 1.

Figure 4:
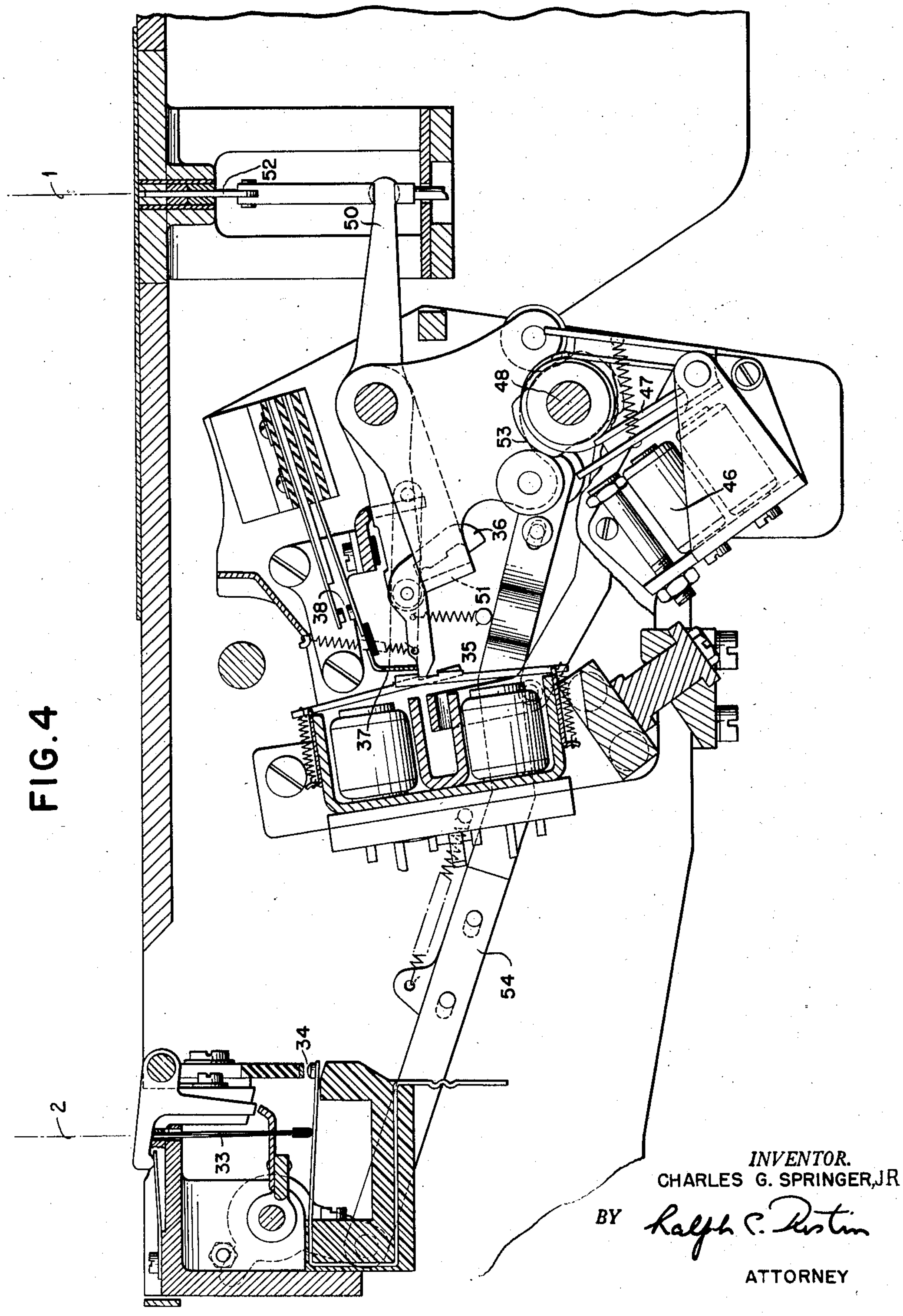
Fig. 4 is a front elevation of the pin sensing and punching mechanisms and a one-revolution clutch cam shaft.

The punching and sensing stations are shown in greater detail in Fig. 4 where a set of pins 33 sense perforations in a card column by column moving from the position F toward position C. As a pin 33 senses a perforation an associated contact 34 closes to energize a corresponding punch interposer magnet 35, thereby actuating an associated interposer 36 which in turn actuates a bail 37. The bail 37 closes a set of contacts 38 to energize an escape magnet 39 shown in Figs. 1 and 2. When the magnet 39 is energized, its armature 42 is withdrawn from an escapement ratchet wheel 41 and the cards are advanced by the card feed wheels 29 and 29*a*. When the magnet 39 is deenergized, its armature 42 moves, under tension of an armature spring 43, into engagement with a tooth of the escapement wheel 41. In the normal operation, a card is passed through the punch station in a column-by-column manner and the card stops momentarily as each column reaches the punching line. This column-by-column escapement is obtained by breaking the escape magnet circuit as soon as the armature is actuated. When the escape magnet 39 is energized, the armature 42 is attracted and a protruding lug 44 operates a contact 45 which is connected in the grid circuit of a tube 121 as seen in Fig. 7. As the contact 45 closes, the tube 121 is caused to conduct and pick up a relay 103–1 of which opens thereby breaking the circuit to escape magnet 39, as will be more fully described hereafter. The magnet 39 is deenergized in time to allow the armature 42 to return under tension of the spring 43 and engage the next tooth on the escape wheel 41. When it is desired to skip several columns, a tube 40*a* is fired under program control from the line 93, through the contact 98–4, the "12" star wheel contact 58 to the line 111. The tube 40*a* fires and energizes a relay 40.

A relay point 40–1I closes and the escape magnet tube 107 is fired by a circuit from the line 93, through the relay point 40–1L and the contact 103–1, thereby energizing the escape magnet 39. It will be noted that the circuit to the tube 121 is opened by the relay point 40–1U, and therefore the relay 103 is not energized and the point 103–1 remains closed allowing the escape magnet 39 to remain energized until the relay 40 is deenergized. The armature 42 is thereby held and the escapement mechanism feeds the card the desired number of columns without intermittent stops. The card in the read station moves concurrently with the card in the punch station since they are controlled by the same escapement mechanism. As viewed in Fig. 2, a punch clutch magnet 46 operates a punch armature 47 whereby a shaft 48 is connected in driven relation with a constantly running pulley 49 which is driven by the motor M. Elements 46, 47 and 48 are also illustrated in Fig. 4 with the circuit connections for the magnet 46 shown in Fig. 7 which will be later described. The cam shaft 48 as shown in Fig. 4 carries a cam which operates a plurality of punch arms 50 through a link and bail 51. The arms 50 actuate all punches 52, whose interposers 36 were set up by interposer magnets 35 as previously described. The rotation of the shaft 48, through a cam 53 and a bail 54 also effects the raising of the sensing pins 33 to sense the next column of the card at the sensing line 2.

The cards are moved step by step through the sensing and punching stations with the operations above described taking place and the data from the sensed card are duplicated in the card at the punching station. Further control is obtained through sensing of perforations in the program card which is mounted on a program drum 56 (Fig. 2). The program drum 56 is so arranged that a standard size record card may be wrapped around and fastened to the drum in the manner described in said patent. The perforated columns in the program card are sensed by star wheel sensing device 58, Fig. 7, while the corresponding columns of a card pass the sensing station. Sensing of the program card controls circuits (partially shown in Fig. 7) for selectively effecting automatic duplication of data from a card at the sensing station or from a card on the auxiliary drum, for duplication from the above sources including blank columns, for printing zeros to the left of a significant digit, for skipping one or more columns or for suppressing printing of the data being punched. Only the circuits necessary for an explanation of the present invention are shown in Fig. 7 in order to avoid complicating the drawings.

Referring now to Fig. 5, a card guide 61 of the usual card feed device is shown. In carrying out the invention, a section 62 is cut out both at the right hand and left hand sides of the guide and two L brackets 63 are spot welded to the rearmost side. Arms of these brackets extend at right angles from the card guide and parallel to each other with aligned holes for receiving a shaft 64 which extends through both L brackets 63 and is held in place by means of two collars 66 retained on shaft 64 by set screws 67. At the right end of the shaft 64 a card lever 71 is mounted by means of a hub 68 and retained thereon by set screws 69. The lever 71 has two oppositely extending arms **71*a* and 71*b* (Fig. 3) which are positioned so that the arm 71*a* extends through the right hand cut-out 62 in the card guide 61 so as to protrude into the path of the right end of a card (left end as viewed from the front of the machine) being fed from the hopper. The second arm 71*b* is so arranged that the card lever 71 may be removed, reversed, and placed on the left end of the shaft 64, in which position the second arm 71*b* will extend through the left hand cut-out 62 and into the path of the left end of a card (right end as viewed from the front of the machine) being fed from the hopper. The position of the arm 71** may also be observed in Fig. 1 relative to the card hopper and path of movement of the card in the machine.

Mounted at the front of the card hopper at the left end, as viewed from the front (Fig. 1), and extending over the card path and the cut-out 62 is a pressure block 73 (Fig. 3) containing an arcuate groove 74 adapted to receive the extreme end of the card lever arm **71*a*. The block 73 resists pressure of the card lever arm 71*a* on a card as it passes between the block and the card guide thereby assuring actuation of the card lever 71** by the cards. A similar pressure block may be mounted at the right end to aid in sensing cards having right hand corner cuts.

A U-bracket 76 extends downward from a frame member 77 comprising the floor of the card hopper and supports a normally closed card feed contact 78 having two straps 79 insulated from each other and from the U-bracket which provide support. The contacts 78 are operated by a lever 83 (see also Fig. 5) which is positioned on the shaft 64, and held in place by a hub 81 so that it is aligned with an extension 84 of the upper strap 79 of the card feed contact. Counterclockwise rotation of the shaft 64 and the lever 83, effected by actuation of the lever 71 by a card, will cause the lever 83 to lift the top strap 79 thereby breaking the contact, whereas a clockwise movement of the shaft 64 and lever 83, under tension of the top strap 79, when the card has passed releases the lever 71, closing the contacts 78.

When a card is fed from the hopper downwardly between the upper feed rolls 13, Fig. 3, and between the card guide 61 and the pressure blocks 73 where the leading edge of the card encounters the card lever arm **71*a* the lever 71, the shaft 64 and the lever 83 are rotated in a counterclockwise direction to open the card feed contacts 78. The card lever arm 71*a* rides along the edge of the card in a path indicated as a line 86 shown in Fig. 6. The card feeds through to the lower feed rolls 13, and as the trailing edge of the card passes the card lever arm 71*a*, the lever is released and is returned to its normal position by the tension of the upper contact strap 79 reclosing the contact 78. The master cards are provided with a corner cut 87 as shown in Fig. 6 whereas on the detail cards that same corner is uncut. A corner cut card actuates the card lever 71 in the same manner as all other cards, but due to the corner cut 87, the card lever is released at a slightly earlier time in the card cycle thereby reclosing the card feed contact 78** at an earlier time and setting up a circuit to suppress punching when the corner cut card passes the punching station.

*Circuit description*

Figure 8:
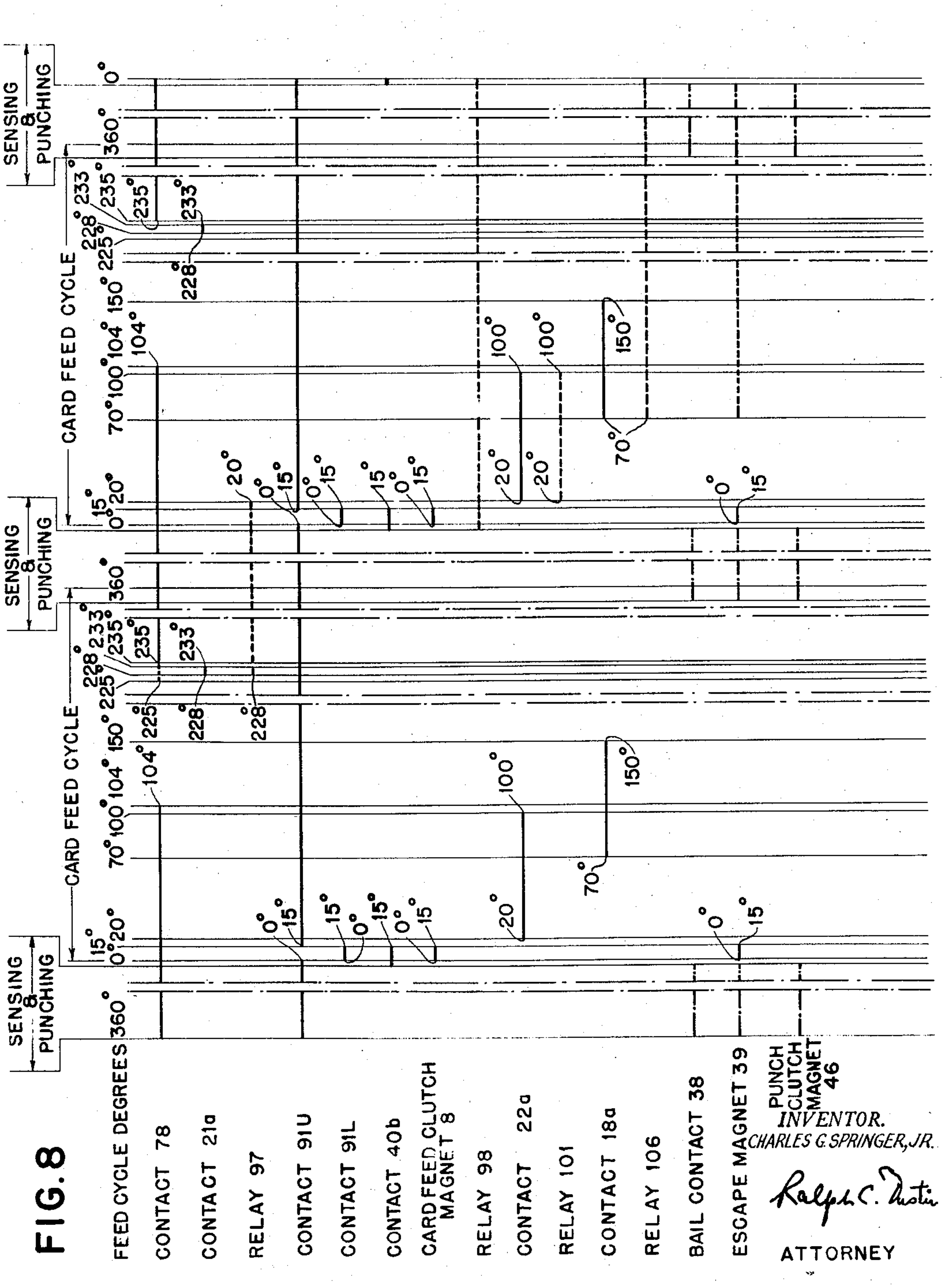
Fig. 8 is a timing chart to be used in conjunction with Fig. 7.

Fig. 8 is a timing chart on which the solid portion of the lines indicate the normal operation of the various contacts and relays, the dashed portions indicate the additional operation when a corner cut master card is sensed as it is fed from the hopper and the dot and dash lines indicate intermittent column by column operation. Registration of cards at the sensing and punching stations is indicated at the left of the chart and three sensing and punching cycles are shown with card feed cycles following the sensing and punching cycles and continuing into the latter.

Normally, with the program 56 rendered operative, for duplicating data from a card at the sensing station 2, as described in Patent No. 2,647,581, each card, as it passes the perforating station 1, will have data duplicated therein corresponding to the data sensed in the preceding card.

In this normal machine operation, as one card arrives at the sensing station and another at the punching station the "0" star wheel contact is closed through the sensing of a "0" hole in the program card on the drum 56 completing a circuit to the line 111 biasing the grid of a tube **116*a* thereby firing the tube and energizing a relay which closes its points 116–1 and 116–2 completing a circuit from the line 93, through the point 116–2, a relay point 88–2 and the winding of a relay 89, thereby energizing the relay 89. The energized relay 89 closes its points 89–1 and 89–2. A circuit is completed from the line 93, through the point 89–2 to the grid of the tube 102, biasing the grid and firing the tube 102 thereby energizing the punch clutch magnet 46. Energizing the punch clutch magnet 46 causes rotation of the shaft 48 which, through the cam 53 and the bail 54 raises the sensing pins 33 to sense the first column of the card at the sensing station. Punching does not occur on this cycle because none of the punch interposers were actuated. The pins 33** sense the holes in column one and energize appropriate interposer magnets 35 (Fig. 4) thereby actuating associated interposers 36 which actuate the bail 37 to close the bail contact 38. A circuit is completed from the line 93, through the contact 38, the relay point 98–5, the relay point 40–1U, the relay point 103–1 to the line 111, thereby firing the tube 107. Through the tube 107, the escapement magnet 39 is energized to allow escapement of the cards at the sensing and punching stations. The armature 42 of the magnet 39 closes the escape interlock contact 45 thereby establishing a circuit from the line 93, through the bail contact 38, and the contact 45 to the line 111, biasing the grid of the tube 121 causing it to conduct thereby energizing the escape interlock relay 103. The relay 103 opens its points 103–1 and closes its points 103–2. The point 103–1 opens the circuit to the tube 107 and the escape magnet 39 is deenergized in time for the armature 52 to fall into the next tooth of the escape wheel 41 so that only a single column of escapement has occurred. Another circuit is completed from the line 93, through the point 103–2 to the line 111, biasing the grid of the tube 102, thereby firing the tube and energizing the punch clutch magnet 46 to initiate a punch and read cycle as previously described. Each cycle in turn initiates the following cycle as long as holes are sensed by the pins 33.

The cards progress in the above described, column by column manner through column 80. As the escapement from column 80 begins, a cam contact 40*b* on the program drum 56 closes completing a circuit from the line 93, through the contact 40*b* to the line 111, biasing the grid of the tube 40*a*, thereby firing the tube 40*a* and energizing the relay 40. As previously described, the escapement magnet 39 is energized through the relay point 40–1L to effect continuous escapement of the cards, until the contact 40*b* is opened as the card from the punching station is registered at the sensing station. After the contact 40*b* closes, another program drum cam contact 91L (Fig. 7) closes, energizing the card feed clutch magnet 8 and energizing the clutch 7 (Fig. 2) thereby initiating a card feed cycle.

The previously sensed card is advanced to position C, the punch card is advanced to position F, a detail card is advanced from the intermediate position A to position E and a card is fed from the hopper to the position A. After fifteen feed cycle degrees, the program drum contact 91L opens and 91U closes and the card feed clutch magnet 8 is deenergized and cards are properly positioned at E and F for duplication as described. The sequence of operation of the elements 8, 38, 39, 40*b* and 91 are illustrated in the timing chart, Fig. 8.

When it is desired to intersperse prepunched master cards and blank detail cards in the hopper for duplicating data from each master card to the following detail cards, duplication is to be suppressed when a master card is in the punching station and either a detail card or another master card is in the sensing station. At such time, passage of master cards through the punching station and immediately preceding cards through the sensing station is to be accelerated.

Assume that duplication from cards in the sensing station to cards in the perforating station has been in progress and, at the moment, a detail card is being read in the sensing station and the data there sensed is being punched in a second detail card at the punching station. Assume further, that a third detail card is in the position A ready to be registered at the punching station during the next card feed cycle. Assume also that the next card in the hopper is a master card having its upper left corner cut.

As punching of the 80th column of the second detail card is completed, in the manner described, a card feed cycle is automatically initiated in the usual manner and escapement of the sensed and punched cards commences. The first detail card advances to position C, the second detail card advances to position F and the third detail card advances to position E and the master card is fed from the hopper past the card lever 71, where the cut corner is detected as described, and on to position A. The master card encounters the card lever 71 at 104° of the card feed cycle (see Fig. 8), opening the card lever contacts 78 (Fig. 7). The card passes under the card lever until the cut corner 87 (Figs. 1 and 6) comes under the card lever 71 and allows the card lever contact 78 to reclose at 225° of the card feed cycle (with an uncut card the contact recloses at 235°). At 228°, the cam 21 closes the contact 21*a* which remains closed until 233°. Consequently, at 228° a circuit is complete from the zero potential line 93, through the contact 21*a*, through a manually operated toggle switch 96, through the contact 78, through the pick winding of a latch relay 97, to the positive potential line 94, picking and latching the relay 97 which closes its point 97–1.

The master card stops at the position A, Fig. 1 and punching of the third detail card, immediately preceding the master card, commences in the described manner. During escapement of the third detail card after punching of its 80th column, and before the card reaches position F, the program drum cam contact 91L closes, establishing the previously described circuit to the card feed clutch magnet 8, thereby initiating a card feed cycle that advances the master card to position E. Contact 91L also establishes another circuit from the line 93 through the contact 91L, through the normally open, now closed relay point 97–1, through the pick winding P of a relay 98, to the plus line 94, energizing the relay 98 and closing the relay points 98–1, 98–2 and 98–3 while opening the relay points 98–4 and 98–5.

The relay 98 will hold through the contact 91–L until the third detail card reaches position F. The contact 91–L opens and the contact 91–U closes as the third detail card reaches position F but the relay 98 is held by a circuit from the line 93, through the contact 91–U through the normally open, now closed, relay point 98–2 and the relay 98H to the line 94. Approximately 3 milliseconds are required for the transfer from the contact 91–L to the contact 91–U, and means must be provided to prevent the relay 98 from dropping out during this transfer. To this end, a second winding 98H on the same core as the winding 98P is shorted on itself by a wire 99 thus delaying the drop out of the relay 98 from 13 to 22 milliseconds and providing a wide margin of safety as compared with the 3 milliseconds transfer time. The relay 98 then holds through the contact 91–U until 0° of the following card feed cycle at which time the last column of the master card will have passed from the punching station. After the contact 91–U closes at 15° of the card feed cycle, the relay 97 is no longer necessary to hold the relay 98, and at 20° the cam contact 22*a* is closed by the cam 22 establishing a circuit from line 93 through the contact 22*a*, through the normally open, now closed relay point 98–1 and a trip relay 101 to the plus line 94. The trip relay 101 unlatches the latch relay 97. At 65° of the card feed cycle during which the third detail card is escaped to position F, the master card is registered at the punching line 1. Normally, at 70° of the card feed cycle, the punch clutch magnet 86 is energized through the "0" star wheel contact, and automatic duplication occurs as described. However, in this instance, the card being fed to position E, that is, the master card, is not to be punched. At 70°, the cam contact 18*a* is closed by the cam 18. The contact 18*a* closes at that time during the normal operation too, but is ineffective then due to the normally open contact point 98–3. A circuit is complete from the line 93, through the contact 18*a*, the contact 98–3 and the winding of a relay 106, to the line 94. The energized relay 106 closes its points 106–1 and 106–2. A hold circuit for the relay 106 is established from the line 93, through the contact 91–U, the point 106–1, and the relay 106 to the line 94. The escape magnet tube 107 is fired by a circuit from the line 93, through the points 106–2, 40–1U and 103–1 to the line 111, thereby energizing the escape magnet 39 and causing escapement of the master card from the punching station and the preceding card from the sensing station. The escape magnet armature 42 operates the contact 45, but the now open contact 98–5 prevents firing of the tube 121. Since the relay 103 is not energized, the relay point 103–1 remains closed and the above cards pass through the sensing and punching stations at an accelerated rate by comparison to the usual column by column escapement. The accelerated escapement is possible due to the suppression of the relay 103, since the contact 103–2 remains open and the usual read and punch cycles are not initiated by the punch clutch magnet 46. The pins 33 remain in their lowered positions and do not interfere with the accelerated escapement.

The contact 98–4 remains open until the master card reaches position F. As indicated in Fig. 7, point 98–4 opens the circuit from the line 93 to the common bus 108 of the star wheel contacts 58, preventing the conditioning of the grids of the program control tubes in response to the sensing of the program card data. If the program control were not suppressed, the relay 40 would be operated opening the point 40–1U and breaking the above traced circuit to the escape magnet 39.

As mentioned heretofore, data may be duplicated from a card in the sensing station or additionally from a card on the auxiliary drum. To duplicate from the auxiliary drum, connections for the interposer magnets 35 are switched from the reading pin contacts 34 (Fig. 7) only three of which are shown, to auxiliary drum star wheel contacts 112 by a manual key 113. The auxiliary drum star wheels 112, only three of which are shown, continue to sense the perforations in the auxiliary drum card, but this is an idle operation since the circuit to the common side of the interposer magnets 35 is normally set up through a duplication relay 116 in the programming circuit and a relay point 116–1. Since programming is suppressed by the relay point 98–4, the duplication relay 116 remains unenergized, and the point 116–1 remains open preventing the connection from the line 93, through the contact 113 and the relay point 116–1 to the common line 114 of the star wheel contacts 112 and interposer magnets 35. Only the effect of the sensing of auxiliary data by the auxiliary drum star wheels is suppressed. The auxiliary drum star wheels run freely and the sensing of holes thereby does not interfere with the accelerated passage of the master card and the preceding detail card.

As the last column of the master card passes the punch line 1, the contact 91–L again closes and another card feed cycle is automatically initiated by the card feed clutch magnet 8 whereby the master card advances to position F, a detail card advances from position A to position E and another detail card advances from the hopper to the position A. Duplication resumes automatically from the master card at position F to the detail card at position E.

As in the case of the corner cut master card, the detail card, as it is fed from the hopper, operates the card lever 71 at 104° of the card feed cycle and opens the contact 78, but since the detail card does not have a cut corner, the contact 78 remains open until 235° instead of closing at 225° as in the case of the corner cut master cards. With the contact 78 open from 104° to 235°, the closing of the contact 21*a* at 228° and its subsequent opening at 233° (before the contact 78 recloses at 235°) is without effect, the latch relay 97 is not picked, and the suppression of sensing and punching while the detail card passes through the punching station is not effected. Each time a master card is detected by its cut corner, the above circuits are set up to suppress punching as the master card passes through the perforation station and to accelerate its passage. In the same manner, punching will be suppressed from one master card to another if a second master card follows without intervening detail cards.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. In a machine for recording data in duplicate on blank records under control of prepared records interspersed with said blank records, recording means arranged as a recording station, sensing pins arranged as an analyzing station and movable to operated position for sensing data in a record card, cyclically operable means for feeding successive records along a path from a record hopper through said recording station and thereafter through said analyzing station, means for intermittently starting and stopping said feeding means whereby a step by step advance of said records is effected, means operable by said pins upon the sensing of data in a record card for actuating corresponding said recording means whereby data sensed in a record at said analyzing station are recorded in duplicate fashion in a record at said recording station and a card lever positioned along said path and under control of each prepared record during one said feed cycle for inhibiting operation of said sensing pins during a next following said feed cycle.

2. The machine of claim 1, including means operated by said last means for disabling the stopping portion of said starting and stopping means whereby the passage of said prepared record through said recording station and a preceding record through said analyzing station occurs in a continuous accelerated manner.

3. In a machine for recording data in duplicate on blank records under control of prepared records interspersed with said blank records, recording means arranged as a recording station, sensing pins arranged as an analyzing station and movable to operated position for sensing data in a record card, cyclically operable means for feeding successive records along a path from a record hopper through said recording station and thereafter through said analyzing station, means for intermittently starting and stopping said feeding means whereby a step by step advance of said records is effected, means operable by said pins upon the sensing of data in a record card for actuating corresponding said recording means whereby data sensed in a record at said analyzing station are recorded in duplicate fashion in a record at said recording station, a card lever positioned along said path and under control of each prepared record during one said feed cycle for inhibiting operation of said sensing means during the next following said feed cycle, auxiliary control means comprising a rotatable control element and control element analyzing means, means for operating the said recording means under control of said control element analyzing means whereby data analyzed by said auxiliary means are recorded in duplicate fashion in a record at said recording station, and means for switching control selectively to said analyzing station and to said auxiliary means, said disabling means being effective to disable said auxiliary control means as well as said sensing pins.

References Cited in the file of this patent

UNITED STATES PATENTS

| | | |
|---|---|---|
| Re. 21,133 | Lake | June 27, 1939 |
| 2,647,581 | Gardinor et al. | Aug. 4, 1953 |